(12) United States Patent
Yamamoto

(10) Patent No.: US 11,004,295 B2
(45) Date of Patent: May 11, 2021

(54) PAPER SHEET HANDLING APPARATUS AND COMMUNICATION METHOD OF PAPER SHEET HANDLING APPARATUS

(71) Applicant: FUJITSU FRONTECH LIMITED, Inagi (JP)

(72) Inventor: Takeshi Yamamoto, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 16/526,373

(22) Filed: Jul. 30, 2019

(65) Prior Publication Data

US 2019/0354732 A1 Nov. 21, 2019

Related U.S. Application Data

(63) Continuation of application No. PCT/JP2017/005787, filed on Feb. 16, 2017.

(51) Int. Cl.
*G07D 11/12* (2019.01)
*G07D 11/13* (2019.01)
(Continued)

(52) U.S. Cl.
CPC ............ *G07D 11/12* (2019.01); *G07D 11/13* (2019.01); *G07D 11/235* (2019.01); *G07D 11/40* (2019.01); *G06K 7/10* (2013.01); *G07D 2211/00* (2013.01)

(58) Field of Classification Search
None
See application file for complete search history.

(56) References Cited

U.S. PATENT DOCUMENTS

| 5,105,364 | A  | * | 4/1992 | Kawamura | .......... | G07D 11/245 |
|           |    |   |        |          |            | 700/219     |
| 7,000,778 | B2 | * | 2/2006 | Omori    | ..................... | G07F 19/20 |
|           |    |   |        |          |            | 209/534     |

(Continued)

FOREIGN PATENT DOCUMENTS

| JP | 62-214744 | 9/1987 |
| JP | 10-268762 | 10/1998 |

(Continued)

OTHER PUBLICATIONS

International Search Report dated May 9, 2017 in corresponding International Patent Application No. PCT/JP2017/005787.

(Continued)

*Primary Examiner* — Christle I Marshall
(74) *Attorney, Agent, or Firm* — Staas & Halsey LLP

(57) ABSTRACT

A paper sheet handling apparatus includes: a plurality of detachable storages each of which stores therein paper sheets; a first storage that stores therein correspondence information, the correspondence information including a plurality of pieces of first identification information and pieces of second identification information that are uniquely associated with the respective pieces of the first identification information; and a first controller configured to: when a storage of the storages is attached, inform the storage of an identification number, and further select, from the correspondence information, first identification information corresponding to the storage; transmit transmitted data to which the identification number and the selected first identification information are set; and execute, in receiving data including the identification number, a receiving process on the data when identification information included in the data coincides with second identification information corresponding (Continued)

to the first identification information set to the transmitted data in the correspondence information.

6 Claims, 13 Drawing Sheets

(51) Int. Cl.
*G07D 11/235* (2019.01)
*G07D 11/40* (2019.01)
*G06K 7/10* (2006.01)

(56) References Cited

U.S. PATENT DOCUMENTS

| | | | | |
|---|---|---|---|---|
| 8,413,785 | B2* | 4/2013 | Hattori | G07F 19/206 |
| | | | | 194/206 |
| 8,646,859 | B2* | 2/2014 | Sugiura | B41J 3/44 |
| | | | | 347/5 |
| 2010/0174402 | A1 | 7/2010 | Hattori et al. | |
| 2013/0050307 | A1* | 2/2013 | Sugiura | B41J 3/44 |
| | | | | 347/5 |
| 2017/0046673 | A1* | 2/2017 | Shibata | G06Q 20/18 |

FOREIGN PATENT DOCUMENTS

| | | |
|---|---|---|
| JP | 2002-108477 | 4/2002 |
| JP | 2004-318415 | 11/2004 |
| JP | 2016-126416 | 7/2016 |
| WO | WO 2008/149433 A1 | 12/2008 |
| WO | WO 2015/163340 A1 | 10/2015 |

OTHER PUBLICATIONS

Written Opinion of the International Searching Authority dated May 9, 2017 in corresponding International Patent Application No. PCT/JP2017/005787.
Japanese Office Action dated Apr. 7, 2020 in Japanese Patent Application No. 2019-500114.
Examination Report dated Mar. 18, 2021 in related Indian Patent Application No. 201937031813 (5 pages).

* cited by examiner

| CASSETTE NUMBER | CASSETTE NUMBER SIGNAL |
|---|---|
| CASSETTE 1 | CASSETTE NUMBER SIGNAL 1 |
| CASSETTE 2 | CASSETTE NUMBER SIGNAL 2 |
| CASSETTE 3 | CASSETTE NUMBER SIGNAL 3 |
| CASSETTE 4 | CASSETTE NUMBER SIGNAL 4 |
| CASSETTE 5 | CASSETTE NUMBER SIGNAL 5 |

FIG.5

| | ┌8b, 6-1b, 6-2b, 6-3b, 6-4b, 6-5b |
|---|---|
| BODY-SIDE CASSETTE ID | CASSETTE-SIDE CASSETTE ID |
| BODY-SIDE CASSETTE ID 1 | CASSETTE-SIDE CASSETTE ID 1 |
| BODY-SIDE CASSETTE ID 2 | CASSETTE-SIDE CASSETTE ID 2 |
| BODY-SIDE CASSETTE ID 3 | CASSETTE-SIDE CASSETTE ID 3 |
| BODY-SIDE CASSETTE ID 4 | CASSETTE-SIDE CASSETTE ID 4 |

PAPER SHEET HANDLING APPARATUS AND COMMUNICATION METHOD OF PAPER SHEET HANDLING APPARATUS

CROSS-REFERENCE TO RELATED APPLICATION

This application is a continuation application of International Application PCT/JP2017/005787, filed on Feb. 16, 2017 and designating the U.S., the entire contents of which are incorporated herein by reference.

FIELD

The present invention relates to a paper sheet handling apparatus and a communication method of the paper sheet handling apparatus.

BACKGROUND

A paper-currency-bill handling apparatus, such as an Automated Teller Machine (ATM), a Cash Dispenser (CD), and a Teller Cash Recycler (TCR), includes a cassette that stores therein paper currency bills. The cassette to be housed in a paper-currency-bill handling apparatus is detachable. When being housed in and attached to a paper-currency-bill handling apparatus, the cassette is communicably connected to a control unit of the paper-currency-bill handling apparatus. The cassette is recognized and controlled by communication with the control unit of the paper-currency-bill handling apparatus.

Patent Document 1: Japanese Laid-open Patent Publication No. 2016-126416

Patent Document 2: Japanese Laid-open Patent Publication No. 2002-108477

Between the control unit of the paper-currency-bill handling apparatus and the cassette, a control unit that is provided, for each cassette, to the control unit of the paper-currency-bill handling apparatus communicates with a control unit mounted on the corresponding cassette. The control units mounted on the respective cassettes have the same spec, and identification of a cassette is not performed when a control unit of the paper-currency-bill handling apparatus communicates with the cassette. Thus, an inauthentic replicated cassette is to communicate, similarly to an authentic cassette, with the control unit of the paper-currency-bill handling apparatus, thereby leading to a problem that the cassette can be easily replicated.

SUMMARY

According to an aspect of the embodiments, a paper sheet handling apparatus includes: a plurality of detachable storages each of which stores therein paper sheets; a first storage that stores therein correspondence information, the correspondence information including a plurality of pieces of first identification information and pieces of second identification information that are uniquely associated with the respective pieces of the first identification information; and a first controller configured to: when a storage of the storages is attached, inform the storage of an identification number, and further select, from the correspondence information, first identification information corresponding to the storage; transmit transmitted data to which the identification number and the selected first identification information are set; execute, in receiving data including the identification number, a receiving process on the data when identification information included in the data coincides with second identification information corresponding to the first identification information set to the transmitted data in the correspondence information; and discard the data when not coinciding with each other.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating one example of an ID correspondence table according to the embodiment;

DESCRIPTION OF EMBODIMENTS

Figure 1:
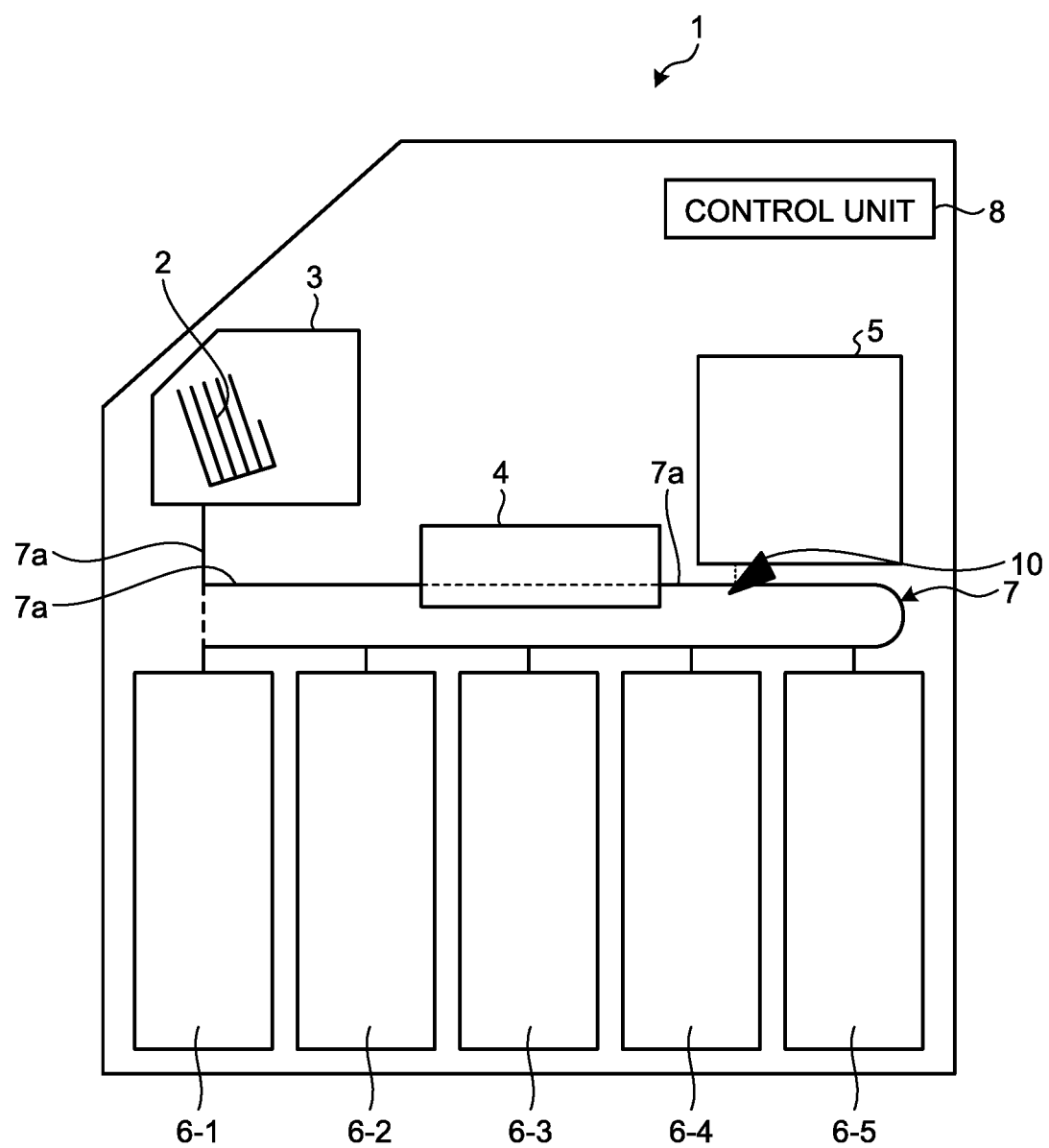
FIG. 1 is a diagram schematically illustrating one example of the whole of a paper-currency-bill handling apparatus according to an embodiment.

Hereinafter, an exemplary embodiment of a paper sheet handling apparatus and a communication method of the paper sheet handling apparatus disclosed in the present application will be described in detail with reference to the accompanying drawings. Moreover, it is not intended that the paper sheet handling apparatus and the communication method of the paper sheet handling apparatus disclosed in the present application be limited to the embodiment described below. Note that an embodiment and a modification described below may be appropriately combined. Note that, for each element to be diagrammatically explained by providing a reference symbol in the drawings, the corresponding element is represented with the same reference symbol, and later explanation of the element is appropriately omitted.

In the embodiment described below, a paper currency bill is employed as one example of a paper sheet; however, not limited thereto. The paper sheet may include a negotiable instrument such as a work paper, a bill, a coupon, various kinds of instrument, and a stock certificate.

Embodiment

Overall Configuration of Paper-Currency-Bill Handling Apparatus

FIG. 1 is a diagram schematically illustrating one example of the whole of a paper-currency-bill handling apparatus according to an embodiment. As illustrated in FIG. 1, a paper-currency-bill handling apparatus 1 according to the embodiment includes a bill deposit and withdrawal unit 3 that deposits therein and withdraws therefrom a paper currency bill 2, and a discrimination unit 4 that discriminates the authenticity of the paper currency bill 2 deposited into the bill deposit and withdrawal unit 3. The paper-currency-bill handling apparatus 1 further includes a temporarily housing part 5 that takes in the paper currency bill 2 conveyed from the discrimination unit 4 and winds it around a dram along with a tape so as to temporarily house it, and cassettes 6-$n$ (n=1, 2, . . . , 5) each of which stores therein the paper currency bill 2 delivered from the temporarily housing part 5 or feeds out the previously-stored paper currency bill 2. Each of the cassettes 6-$n$ is detachable to/from the paper-currency-bill handling apparatus 1.

In the embodiment, the number of the cassettes is five of the cassettes 6-$n$ (n=1, 2, . . . , 5); however, not limited thereto. The cassette is one example of a storage that stores therein paper currency bills.

The paper-currency-bill handling apparatus 1 includes a conveyance mechanism 7 that conveys the paper currency bill 2, and a conveyance-direction switching gate 10 that switches a conveyance direction of the paper currency bill 2. The conveyance mechanism 7 includes a conveyance path 7$a$ that conveys the paper currency bill 2 between the bill deposit and withdrawal unit 3, the discrimination unit 4, the temporarily housing part 5, and the cassettes 6-$n$. The conveyance-direction switching gate 10 switches a conveyance direction to guide the paper currency bill 2 on the conveyance path 7$a$, and causes the temporarily housing part 5 to wind and house it. The conveyance-direction switching gate 10 switches a conveyance direction to guide the paper currency bill 2 unwound from the temporarily housing part 5, and feeds out it toward the conveyance path 7$a$. The conveyance-direction switching gate 10 switches a conveyance direction to guide the paper currency bill 2 on the conveyance path 7$a$, and conveys the paper currency bill 2 to the cassettes 6-$n$ without causing the temporarily housing part 5 to house the paper currency bill 2.

The paper-currency-bill handling apparatus 1 includes a control unit 8 that individually controls the bill deposit and withdrawal unit 3, the discrimination unit 4, the temporarily housing part 5, the cassettes 6-$n$, and the conveyance mechanism 7.

For example, the paper-currency-bill handling apparatus 1 feeds out the paper currency bill 2 one-by-one, which is deposited into the bill deposit and withdrawal unit 3 at a deposit, to the conveyance path 7$a$ with the use of a feed-out mechanism. The paper-currency-bill handling apparatus 1 determines whether the fed-out paper currency bill 2 is true or false with the used of the discrimination unit 4, and then stores the fed-out paper currency bill 2 in the temporarily housing part 5. After all of the put-in paper currency bills 2 have been stored in the temporarily housing part 5, the paper-currency-bill handling apparatus 1 presents a deposited amount of money to a depositor, and when the deposited amount of money is fixed by the depositor, the paper-currency-bill handling apparatus 1 feeds out the paper currency bill 2 from the temporarily housing part 5 to store it in the cassettes 6-$n$. When the depositor selects to return the deposited paper currency bill, the paper-currency-bill handling apparatus 1 feeds out the paper currency bill 2 from the temporarily housing part 5, stores all of the paper currency bills 2 in the bill deposit and withdrawal unit 3 so as to return the paper currency bill 2 to the depositor. The paper-currency-bill handling apparatus 1 does not convey, to the temporarily housing part 5, a paper sheet other than the paper currency bill 2, such as a receipt, the paper currency bill 2 that is not able to be read, etc., and houses them in the bill deposit and withdrawal unit 3 so as to return them to the depositor.

For example, the paper-currency-bill handling apparatus 1 feeds out, form the cassettes 6-$n$, the paper currency bill 2 whose amount is specified by a withdrawer at a withdrawal, determines whether the fed-out paper currency bill 2 is true or false with the use of the discrimination unit 4, and stores the specified amount of the paper currency bill 2 in the bill deposit and withdrawal unit 3. The paper-currency-bill handling apparatus 1 conveys, to a collection box (not illustrated), the paper currency bill 2 that is not appropriate for a withdrawal. The withdrawer takes out the specified amount of the paper currency bill 2 stored in the bill deposit and withdrawal unit 3.

Functional Blocks of Paper-Currency-Bill Handling Apparatus

Figure 2:
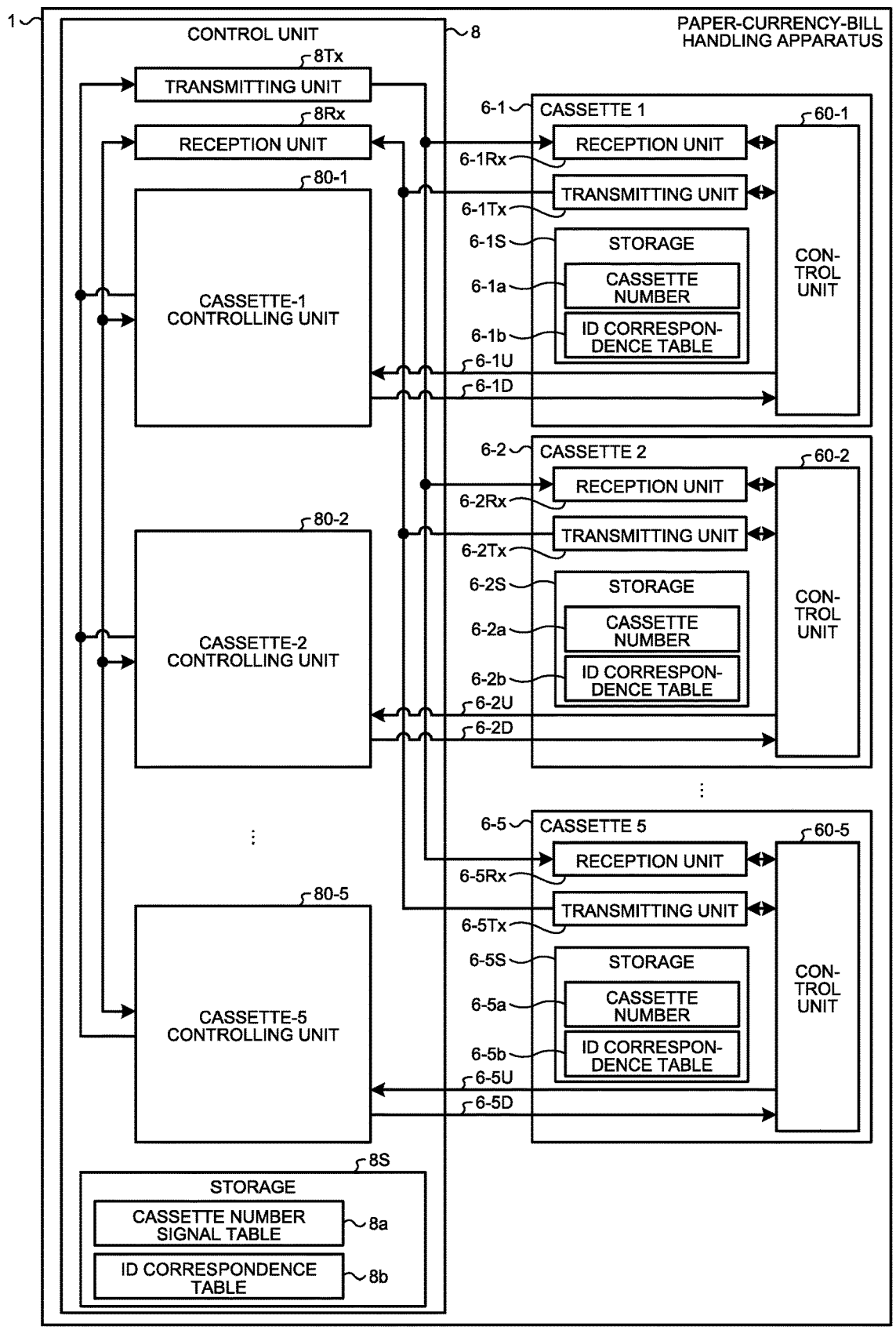
FIG. 2 is a functional block diagram illustrating one example of the paper-currency-bill handling apparatus according to the embodiment.

FIG. 2 is a functional block diagram illustrating one example of the paper-currency-bill handling apparatus according to the embodiment. In FIG. 2, a configuration other than the cassettes 6-$n$ and the control unit 8 of the paper-currency-bill handling apparatus 1 is omitted. In FIG. 2, illustration of configurations of the cassettes 6-$n$ regarding storing of paper currency bills is omitted.

Control Unit of Paper-Currency-Bill Handling Apparatus

The control unit 8 includes a transmitting unit 8Tx, a reception unit 8Rx, cassette-n controlling units 80-$n$ (n=1, 2, . . . , 5), and a storage 8S. The cassette-n controlling units 80-$n$ correspond to the respective cassettes 6-$n$. The control unit 8 is multidrop-connected to the cassettes 6-$n$, and communicates with the cassettes 6-$n$ in a multidrop connection manner. The multidrop connection communication according to the embodiment is communication between the transmitting device and a specific address device, in which a transmitting device transmits, to all of the devices, data in which an identifier of the specific address device is embedded; although all of the devices receive the data of the specific address device; the specific address device responds to the received data; and the other devices return data in which identifiers of the respective other devices are embedded. In the control unit 8 according to the embodiment, the transmitting unit 8Tx, the reception unit 8Rx, the cassette-n controlling units 80-$n$, and the storage 8S are constituted of modules that are independent from one another; however, not limited thereto, they may be appropriately separated or integrated in accordance with processing efficiency, mounting efficiency, etc.

The control unit 8 is implemented by a Field Programmable Gate Array (FPGA). The control unit 8 may be implemented by, not limited to the FPGA, a similar kind of a Programmable Logic Device (PLD) such as an Application Specific Integrated Circuit (ASIC) and a Complex Programmable Logic Device (CPLD). In the embodiment, the transmitting unit 8Tx, the reception unit 8Rx, the cassette-n controlling units 80-$n$, and the storage 8S are implemented by one PLD; however, may be implemented by a plurality of PLDs whose functions are appropriately dispersed.

The cassette-n controlling units 80-$n$ are connected to control units 60-$n$ ($n=1, 2, \ldots, 5$) of the cassettes 6-$n$, which are to be mentioned later, via signal lines 6-$n$U ($n=1, 2, \ldots, 5$) and signal lines 6-$n$D ($n=1, 2, \ldots, 5$). The cassette-n controlling units 80-$n$ correspond to the control units 60-$n$ of the cassettes 6-$n$.

Each of the cassette-n controlling units 80-$n$ detects, via the corresponding signal line 6-$n$U, a cassette setting signal indicating that the corresponding cassette 6-$n$ is physically attached to the paper-currency-bill handling apparatus 1. When the cassette 6-$n$ is physically attached to the paper-currency-bill handling apparatus 1, the cassette setting signal is output via the signal line 6-$n$U. The cassette-n controlling unit 80-$n$ detects a cassette setting signal as long as the cassette 6-$n$ is physically attached to the paper-currency-bill handling apparatus 1.

When detecting a cassette setting signal, the cassette-n controlling unit 80-$n$ determines whether or not "cassette n is recognized as cassette n" ($n=1, 2, \ldots, 5$).

Herein, "cassette n is recognized as cassette n" means that the cassette-n controlling unit 80-$n$ has received an FPGA starting-up signal from the cassette 6-$n$ via the signal line 6-$n$U, the cassette-n controlling unit 80-$n$ has further transmitted a cassette-number signal indicating "cassette number" ("cassette n") to the cassette 6-$n$ via the signal line 6-$n$D ($n=1, 2, \ldots, 5$), the cassette-n controlling unit 80-$n$ has further received a cassette-number reception signal from the cassette 6-$n$ via the signal line 6-$n$U, and the cassette-n controlling unit 80-$n$ has further decided a cassette ID to be set in a predetermined field of cassette-n module data ($n=1, 2, \ldots, 5$) addressed to the cassette 6-$n$. The FPGA starting-up signal, the cassette-number signal, the cassette-number reception signal, the cassette-n module data, the cassette number, and the cassette ID will be mentioned later.

Furthermore, "cassette n is not recognized as cassette n" means that the cassette-n controlling unit 80-$n$ has not yet transmitted a cassette-number signal indicating "cassette number" ("cassette n") to the cassette 6-$n$, or the cassette-n controlling unit 80-$n$ has not yet received a cassette-number reception signal from the cassettes 6-$n$, or the cassette-n controlling unit 80-$n$ has not yet decided a cassette ID to be set in a predetermined field of cassette-n module data to be transmitted to the cassettes 6-$n$.

Frame Format of Module Data

Figures 3, 4:
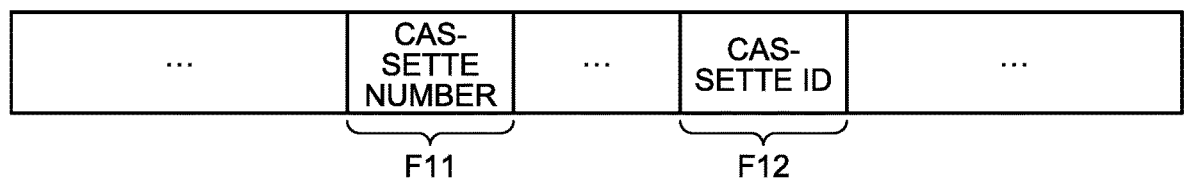
FIG. 3 is a diagram illustrating one example of a frame format of module data in the paper-currency-bill handling apparatus according to the embodiment.
FIG. 4 is a diagram illustrating one example of a cassette number signal table according to the embodiment.

FIG. 3 is a diagram illustrating one example of a frame format of module data in the paper-currency-bill handling apparatus according to the embodiment. When the cassette n is recognized as the cassette n, the cassette-n controlling unit 80-$n$ generates cassette-n module data ($n=1, 2, \ldots, 5$) having a predetermined field to which a cassette number and a cassette ID are set. For example, as illustrated in FIG. 3, in the cassette-n module data, a cassette number is set in a field F11, and a cassette ID is set in a field F12. Positions of the field F11 and the field F12 are previously decided.

Returning to FIG. 2, the cassette-n controlling unit 80-$n$ transmits, to the transmitting unit 8Tx, the generated cassette-n module data. Simultaneously, the cassette-n controlling unit 80-$n$ transmits, to the reception unit 8Rx, a cassette number and a cassette ID that are set to the generated cassette-n module data. The reception unit 8Rx temporarily stores therein a combination of the received cassette number and cassette ID.

On the other hand, when the cassette n is not recognized as the cassette n, the cassette-n controlling unit 80-$n$ transmits to the cassette 6-$n$, via the signal line 6-$n$D, a cassette-number signal indicating the "cassette number" ("cassette n"). The cassette-n controlling unit 80-$n$ decides, at random, a cassette ID to be set in a predetermined field of the cassette-n module data (issue of cassette ID). The cassette-n controlling unit 80-$n$ sets, to the cassette-n module data, the cassette number and the issued cassette ID. Next, the cassette-n controlling unit 80-$n$ transmits, to the transmitting unit 8Tx, the cassette-n module data. Simultaneously, the cassette-n controlling unit 80-$n$ transmits, to the reception unit 8Rx, the cassette number and the cassette ID that are set to the cassette-n module data. The reception unit 8Rx temporarily stores therein a combination of the received cassette number and cassette ID.

The cassette ID to be set in the cassette-n module data may be selected in accordance with predetermined algorithm.

In the embodiment, the cassette-n controlling unit 80-$n$ is explained to receive a cassette setting signal, an FPGA starting-up signal, and a cassette-number reception signal via the one signal line 6-$n$U; however, a signal line may be provided for each of the signals.

The storage 8S is a non-volatile storage to include a cassette number signal table 8a and an ID correspondence table 8b. The ID correspondence table 8b and an ID correspondence table 6-$n$b may be tamper-resistant.

Cassette Number Signal Table

FIG. 4 is a diagram illustrating one example of the cassette number signal table according to the embodiment. As illustrated in FIG. 4, the cassette number signal table 8a stores therein a "cassette number" and a "cassette-number signal" in association with each other. The "cassette number" is a number for uniquely identifying a cassette that is attached to the paper-currency-bill handling apparatus 1 so that the "cassette number" ("cassette n") indicates the cassette 6-$n$. The "cassette number" of a cassette attached, as the cassette 6-$n$, to the paper-currency-bill handling apparatus 1 is the "cassette n".

The "cassette-number signal" is signal data for informing a cassette attached to the paper-currency-bill handling apparatus 1 of the "cassette number". When detecting that the cassette 6-$n$ is physically attached to the paper-currency-bill handling apparatus 1, the cassette-n controlling unit 80-$n$ acquires, from the cassette number signal table 8a, a "cassette-number signal" ("cassette-number signal n") ($n=1, 2, \ldots, 5$) corresponding to the "cassette number" ("cassette n") ($n=1, 2, \ldots, 5$). The cassette-n controlling unit 80-$n$ transmits, to the cassette 6-$n$, the acquired "cassette-number signal n". It is not until the cassette 6-$n$ receives a cassette-number signal that the cassette 6-$n$ recognizes its own cassette number.

ID Correspondence Table

FIG. 5 is a diagram illustrating one example of an ID correspondence table according to the embodiment. As illustrated in FIG. 5, the ID correspondence table 8b stores therein a "body-side cassette ID" and a "cassette-side cassette ID" in unique association with each other. The "body-side cassette ID" and the "cassette-side cassette ID" are, for example, unique associated identification information. As described below, each of the cassettes 6-$n$ includes the corresponding ID correspondence table 6-nb (n=1, 2, ..., 5) that is the same as the ID correspondence table 8b. In FIG. 5, the number of sets of "body-side cassette ID" and "cassette-side cassette ID" is explained to be four; however, not limited thereto, it is sufficient that the number of the sets is equal to or more than two.

Returning to explanation of FIG. 2, when the cassette 6-n is attached to the paper-currency-bill handling apparatus 1 and informing the cassette number of the attached cassettes 6-n, the cassette-n controlling unit 80-n decides, at random, one cassette ID from among "body-side cassette IDs" included in the ID correspondence table 8b (issue of cassette ID). The one cassette ID to be decided, for the cassette 6-n, from among the "body-side cassette IDs" may duplicate with a cassette ID that is decided for another cassette 6-m (n=1, 2, ..., 5, m≠n). The cassette-n controlling unit 80-n sets, for a predetermined field of cassette-n module data addressed to the cassette 6-n, the cassette number and the issued cassette ID, and transmits the cassette number and the issued cassette ID to the cassette 6-n via the transmitting unit 8Tx.

When the detection of a cassette setting signal of the cassette 6-n attached to the paper-currency-bill handling apparatus 1 interrupts, the cassette-n controlling unit 80-n re-decides a cassette ID issued for the cassette 6-n.

Timing of Transmitting Process to Cassette

Figure 6:
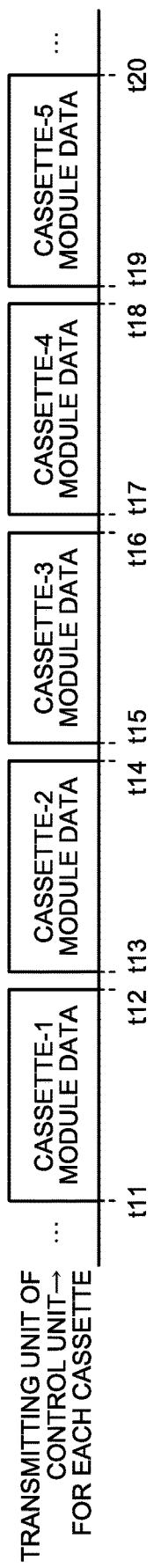
FIG. 6 is a timing diagram illustrating a transmitting process, to a cassette, of a control unit of the paper-currency-bill handling apparatus according to the embodiment.

FIG. 6 is a timing diagram illustrating a transmitting process, to a cassette, of the control unit of the paper-currency-bill handling apparatus according to the embodiment. As illustrated in FIG. 6, the transmitting unit 8Tx repeatedly transmits cassette-n module data received from each of the cassette-n controlling units 80-n, in the order of cassette-1 module data (timing t11 to t12), cassette-2 module data (timing t13 to t14), cassette-3 module data (timing t15 to t16), cassette-4 module data (timing t17 to t18), and then cassette-5 module data (timing t19 to t20). When the cassette 6-n is not set to the paper-currency-bill handling apparatus 1, or the transmitting unit 8Tx does not receive cassette-n module data itself from the cassette-n controlling unit 80-n in transmitting cassette-n module data, the transmitting unit 8Tx transmits dummy data. Thus, the transmitting unit 8Tx keeps a transmitting period and a transmitting order of the cassette-n module data.

The reception unit 8Rx receives, from the cassette 6-n, response cassette-n module data (n=1, 2, ..., 5) in response to the transmitted cassette-n module data. A format of the response cassette-n module data is the same as that of the cassette-n module data (see FIG. 3).

Timing of Receiving Process from Cassette

Figure 7:
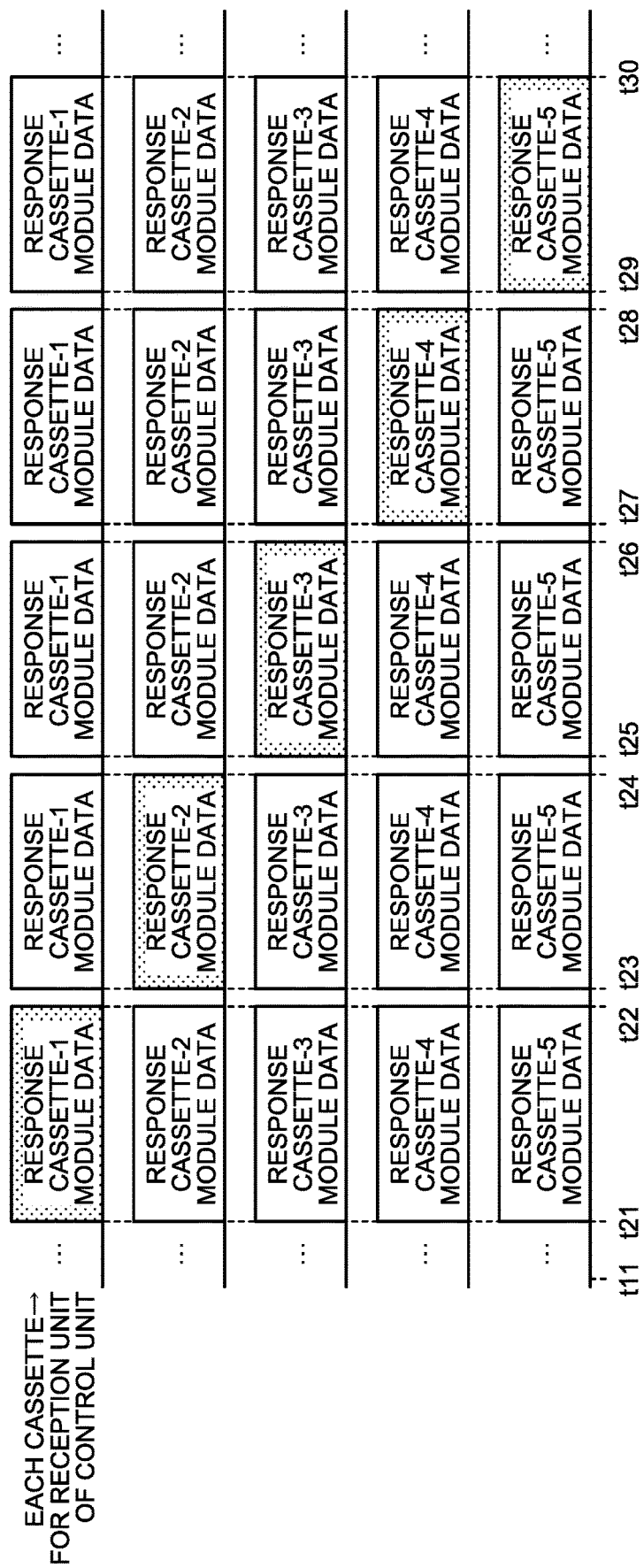
FIG. 7 is a timing diagram illustrating a receiving process, from the cassette, of the control unit of the paper-currency-bill handling apparatus according to the embodiment.

FIG. 7 is a timing diagram illustrating a receiving process, from the cassette, of the control unit of the paper-currency-bill handling apparatus according to the embodiment. Response cassette-n module data are simultaneously transmitted to the reception unit 8Rx from all of the cassettes 6-n (see timing t21 to t22, timing t23 to t24, timing t25 to t26, timing t27 to t28, and timing t29 to t30 illustrated in FIG. 7). However, the reception unit 8Rx selectively and repeatedly receives response cassette-n module data in the order of response cassette-1 module data (timing t21 to t22), response cassette-2 module data (timing t23 to t24), response cassette-3 module data (timing t25 to t26), response cassette-4 module data (timing t27 to t28), and response cassette-5 module data (timing t29 to t30) (see hatched part illustrated in FIG. 7). Each timing when the reception unit 8Rx selectively receives corresponding response cassette-n module data is slightly later than that when the response cassette-n module data is transmitted.

For example, response cassette-n module data is transmitted to the reception unit 8Rx from all of the cassettes 6-n in response to the cassette-1 module data transmitted from the transmitting unit 8Tx during timing t11 to t12 illustrated in FIG. 6 (see timing t21 to t22 illustrated in FIG. 7). However, during timing t21 to t22 illustrated in FIG. 7, the reception unit 8Rx receives only response cassette-1 module data in response to the cassette-1 module data (see hatched part during timing t21 to t22 illustrated in FIG. 7).

In a case of receiving the response cassette-n module data, when the cassette 6-n is not set to the paper-currency-bill handling apparatus 1, the reception unit 8Rx spuriously receives dummy data as response cassette-n module data transmitted from the cassettes 6-n, so as to keep the reception period and the reception order.

Returning to FIG. 2, the reception unit 8Rx acquires a "body-side cassette ID" corresponding to the "cassette-side cassette ID", with reference to the ID correspondence table 8b while regarding a cassette ID that is set in a predetermined field of response cassette-n module data as the "cassette-side cassette ID". When a combination of the cassette number set in the received response cassette-n module data and the "body-side cassette ID" acquired from the ID correspondence table 8b coincides with a combination of the temporarily-stored cassette number and cassette ID, the reception unit 8Rx determines that the cassette 6-n, which is a transmitting destination of response cassette-n module data, is an authentic cassette. The reception unit 8Rx transmits the received response cassette-n module data to the cassette-n controlling unit 80-n. As described above, the cassette-n controlling unit 80-n starts and continues to communicate with the cassette 6-n.

On the other hand, when the combination of the cassette number set in the received response cassette-n module data and the "body-side cassette ID" acquired from the ID does not coincide with the combination of the temporarily-stored cassette number and cassette ID, the reception unit 8Rx determines that the cassette 6-n transmitting the response cassette-n module data is an inauthentic cassette. The reception unit 8Rx does not transmit to the cassette-n controlling unit 80-n but discard the received response cassette-n module data. As described above, the cassette-n controlling units 80-n shuts the communication with the cassette 6-n.

Cassette of Paper-Currency-Bill Handling Apparatus

Each of the cassettes 6-n illustrated in FIG. 2 has the same configuration. In FIG. 2, the cassette 6-n is indicated as the "cassette number" ("the cassette n") (n=1, 2, ..., 5, see FIG. 4), the "cassette number" is the cassette number that is allocated by the control unit 8 of the paper-currency-bill handling apparatus 1 in response that the cassette 6-n is attached to the paper-currency-bill handling apparatus 1.

The cassette 6-n includes a reception unit 6-nRx (n=1, 2, ..., 5), a transmitting unit 6-nTx (n=1, 2, ..., 5), a storage 6-nS (n=1, 2, ..., 5), and a control unit 60-n (n=1, 2, ..., 5). The reception unit 6-nRx, the transmitting unit 6-nTx, the storage 6-nS, and the control unit 60-n are implemented with the use of the FPGA. The reception unit 6-nRx, the transmitting unit 6-nTx, the storage 6-nS, and the control unit 60-n may be implemented with the use of, not limited to the FPGA, another kind of a PLD such as ASIC and CPLD. In the embodiment, the reception unit 6-nRx, the transmitting unit 6-nTx, the storage 6-nS, and the control unit 60-n are implemented by one PLD; however, may be implemented by a plurality of PLDs whose functions are appropriately dispersed.

In each of the cassettes 6-n according to the embodiment, the reception unit 6-nRx, the transmitting unit 6-nTx, the storage 6-nS, and the control unit 60-n are constituted of modules that are independent from one another; however, not limited thereto, they may be appropriately separated or integrated in accordance with processing efficiency, mounting efficiency, etc.

When being attached to the paper-currency-bill handling apparatus 1, the cassette 6-n detects that the cassette 6-n itself is attached to the paper-currency-bill handling apparatus 1. The cassette 6-n outputs a cassette setting signal via the signal line 6-nU, and the cassette-n controlling unit 80-n detects that the cassette 6-n is attached to the paper-currency-bill handling apparatus 1. When the cassette 6-n is attached to the paper-currency-bill handling apparatus 1, in the cassette 6-n, the FPGA including the reception unit 6-nRx, the transmitting unit 6-nTx, the storage 6-nS, and the control unit 60-n starts to start up. When the start-up of the FPGA has been completed, the control unit 60-n transmits, to the cassette-n controlling unit 80-n, a start-up signal indicating the completion of the start-up via the signal line 6-nU. When receiving, from the cassette-n controlling unit 80-n, a cassette-number signal via the signal line 6-nD, the control unit 60-n transmits, in response thereto, a cassette-number reception signal to the cassette-n controlling unit 80-n via the signal line 6-nU.

The storage 6-nS has a cassette number 6-na (n=1, 2, ..., 5) and the ID correspondence table 6-nb. The cassette number 6-na is the cassette number of the cassette 6-n, which is reported from the cassette-n controlling unit 80-n with the use of a cassette-number signal.

When determining a cassette number and a cassette ID that are set in the module data received from the control unit 8, and the cassette number included in the received module data is cassette-n module data addressed to the cassettes 6-n, which coincides with the cassette number 6-na, the reception unit 6-nRx transmits the received cassette-n module data to the control unit 60-n.

When receiving cassette-n module data from the reception unit 6-nRx, the control unit 60-n acquires, from the ID correspondence table 6-nb, a "cassette-side cassette ID" corresponding to a "body-side cassette ID" with reference to the ID correspondence table 6-nb (see FIG. 5) while regarding a cassette ID set to the cassette-n module data as the "body-side cassette ID". The control unit 60-n sets, to the received cassette-n module data, the "cassette-side cassette ID" acquired from the ID correspondence table 6-nb, and generates response cassette-n module data addressed to the cassette-n controlling unit 80-n. When generating the response cassette-n module data, the control unit 60-n updates a cassette ID previously-set to the cassette-n module data with the "cassette-side cassette ID" acquired from the ID correspondence table 6-nb.

The control unit 60-n transmits the generated response cassette-n module data to the transmitting unit 6-nTx. The transmitting unit 6-nTx transmits, to the control unit 8, the response cassette-n module data received from the control unit 60-n.

On the other hand, when determining the cassette number and the cassette ID set to the module data received from the control unit 8, and the received module data is not cassette-n module data to be addressed to the cassette 6-n, the reception unit 6-nRx informs the control unit 60-n of the fact indicating that module data not addressed to the cassettes 6-n is received from the reception unit 6-nRx.

When receiving the fact indicating that the reception unit 6-nRx receives module data not addressed to the cassette 6-n, the control unit 60-n generates response cassette-n module data, addressed to the cassette-n controlling unit 80-n corresponding to the cassette-n module data, having a predetermined field to which a "cassette number" of the cassette 6-n is set. The control unit 60-n transmits, to the transmitting unit 6-nTx, the generated response cassette-n module data. The transmitting unit 6-nTx transmits, to the control unit 8, the response cassette-n module data received from the control unit 60-n.

Figure 8:
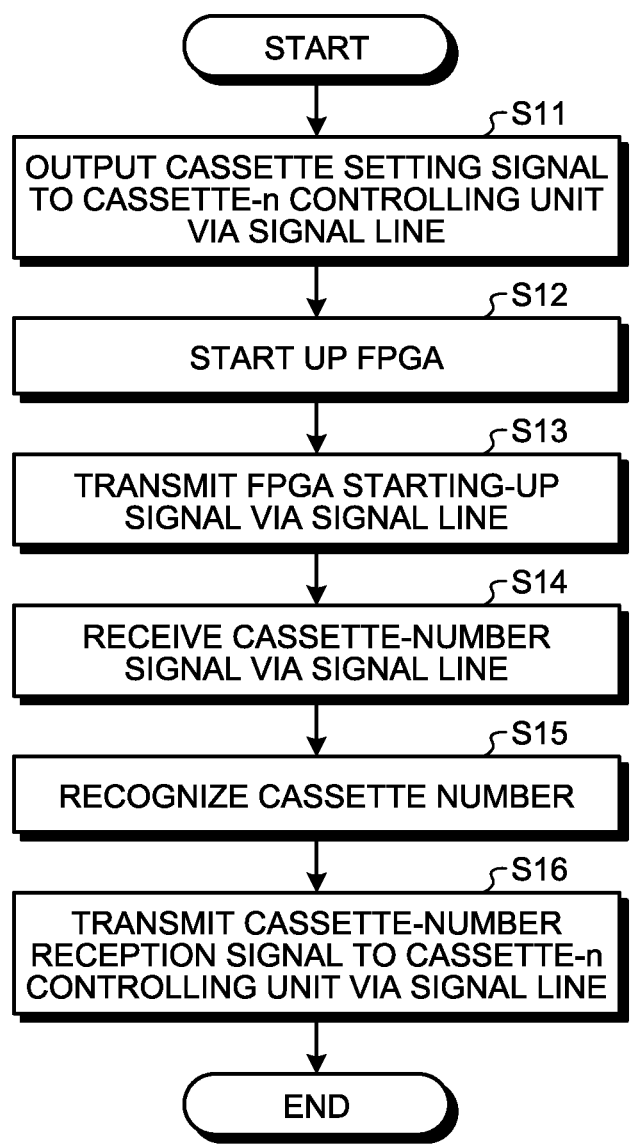
FIG. 8 is a flowchart illustrating a process at attaching cassette in a control unit of the cassette according to the embodiment.

Process at Attaching Cassette in Control Unit of Cassette According to Embodiment FIG. 8 is a flowchart illustrating a process at attaching cassette in the control unit of the cassette according to the embodiment. The process at attaching cassette in the control unit 60-n of the cassette 6-n according to the embodiment is to be independently executed for each of the cassettes 6-n, each time when the cassette 6-n is set to the paper-currency-bill handling apparatus 1.

The cassette 6-n outputs a cassette setting signal to the cassette-n controlling unit 80-n via the signal line 6-nU (Step S11). Next, the cassette 6-n starts up the FPGA including the reception unit 6-nRx, the transmitting unit 6-nTx, the storage 6-nS, and the control unit 60-n (Step S12). Next, the control unit 60-n of the cassette 6-n transmits an FPGA starting-up signal, indicating the fact that the starting-up of the FPGA has been completed, to the cassette-n controlling unit 80-n via the signal line 6-nU (Step S13).

Next, the control unit 60-n receives, from the cassette-n controlling unit 80-n, a "cassette-number signal" indicating a "cassette number" via the signal line 6-nD (Step S14). Next, the control unit 60-n recognizes a cassette number of the own cassette 6-n from the received "cassette-number signal" (Step S15). Next, the control unit 60-n transmits a "cassette-number reception signal" to the cassette-n controlling unit 80-n via the signal line 6-nU (Step S16). When Step S16 has ended, the control unit 60-n ends the process at attaching cassette.

Figure 9:
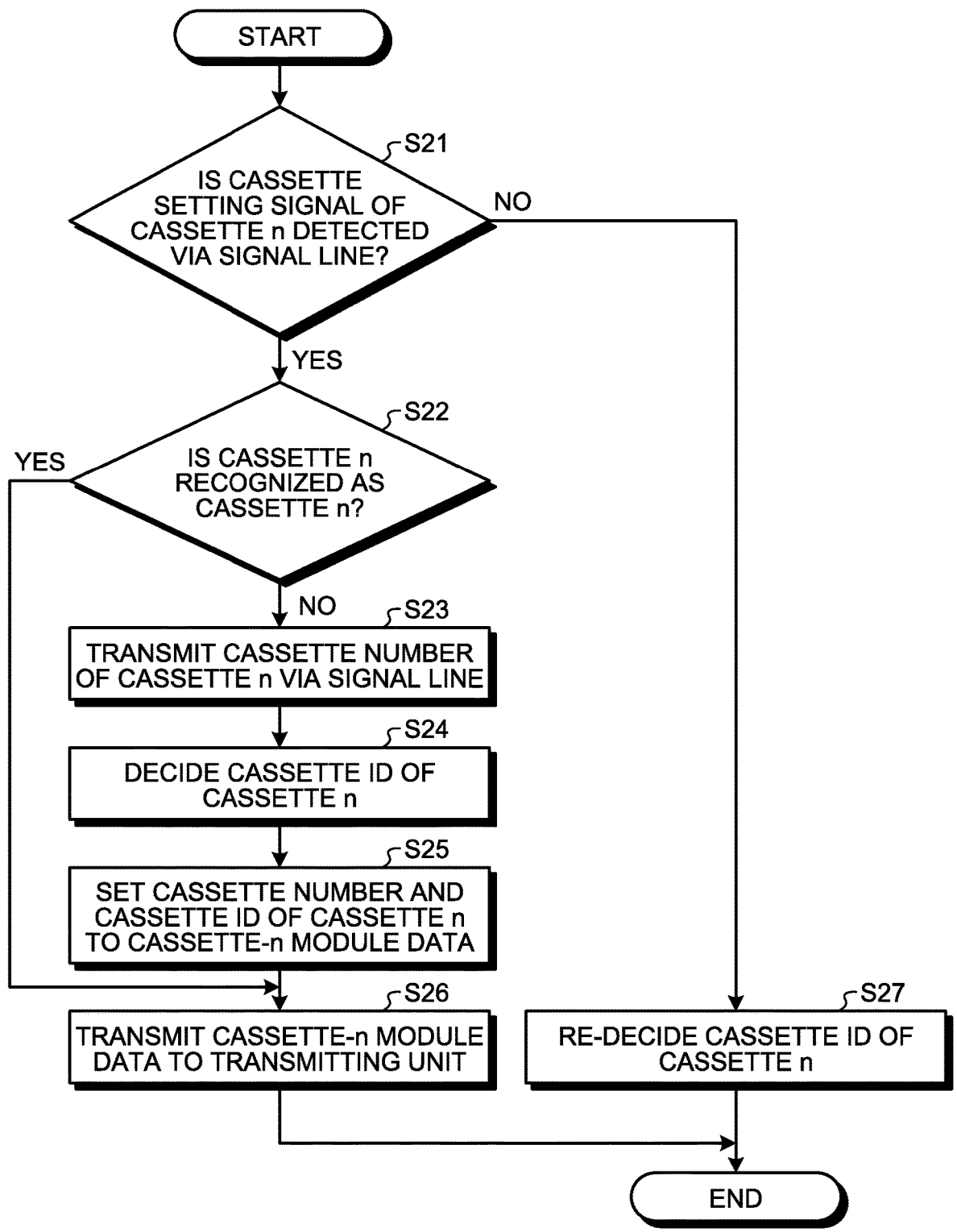
FIG. 9 is a flowchart illustrating a transmitting process in the control unit of the paper-currency-bill handling apparatus according to the embodiment.

Transmitting Process in Control Unit of Paper-Currency-Bill Handling Apparatus According to Embodiment FIG. 9 is a flowchart illustrating a transmitting process in the control unit of the paper-currency-bill handling apparatus according to the embodiment. The transmitting process in the control unit 8 of the paper-currency-bill handling apparatus 1 according to the embodiment is to be independently executed for each of the cassette-n controlling units 80-n in predetermined periods (for example, one second).

The cassette-n controlling unit 80-n determines whether or not detecting a cassette setting signal of the cassette 6-n via the signal line 6-nU (Step S21). When detecting a cassette setting signal of the cassette 6-n (Step S21: Yes), the cassette-n controlling unit 80-n shifts the processing to Step S22. On the other hand, when not detecting a cassette setting signal of the cassette 6-n (Step S21: No), the cassette-n controlling unit 80-n shifts the processing to Step S27.

In Step S22, the cassette-n controlling unit 80-n determines whether or not "the cassette n is recognized as the cassette n". When "the cassette n is recognized as the cassette n" (Step S22: Yes), the cassette-n controlling unit 80-n shifts the processing to Step S26, and when "the cassette n is not recognized as the cassette n" (Step S22: No), the cassette-n controlling unit 80-n shifts the processing to Step S23.

In Step S23, the cassette-n controlling unit 80-n informs of the cassette number of the cassette 6-n, and thus transmits a cassette-number signal to the cassette 6-n via the signal line 6-nD. Next, the cassette-n controlling unit 80-n selects at random, from the ID correspondence table 8b, one "body-side cassette ID" as a cassette ID of the cassette 6-n, so as to decide a cassette ID of the cassette n (cassette 6-$n$) (Step S24). Next, the cassette-n controlling unit 80-$n$ sets a cassette number and a cassette ID of the cassette n (cassette 6-$n$) in a predetermined field of cassette-n module data (Step S25).

In Step S26, the cassette-n controlling unit 80-$n$ transmits the cassette-n module data to the transmitting unit 8Tx. Simultaneously, the cassette-n controlling unit 80-$n$ transmits, to the reception unit 8Rx, the cassette number and the cassette ID that are set to the cassette-n module data. The reception unit 8Rx temporarily stores therein the received cassette ID of the cassette-n module data.

On the other hand, in Step S27, the cassette-n controlling unit 80-$n$ re-selects at random, from among "body-side cassette IDs" of the ID correspondence table 8$b$, a cassette ID to be issued for the cassette 6-$n$, so as to re-decide a cassette ID of the cassette n (cassettes 6-$n$). When Step S27 has ended, the cassette-n controlling unit 80-$n$ ends the transmitting process in the control unit 8. The transmitting process in the control unit 8 is to be periodically executed (for example, for each one second), when a cassette setting signal of the cassette 6-$n$ is not detected for a time interval longer than one second, for example, detachment of the cassettes 6-$n$ is performed, re-deciding of a cassette ID in Step S27 is to be executed.

Figure 10:
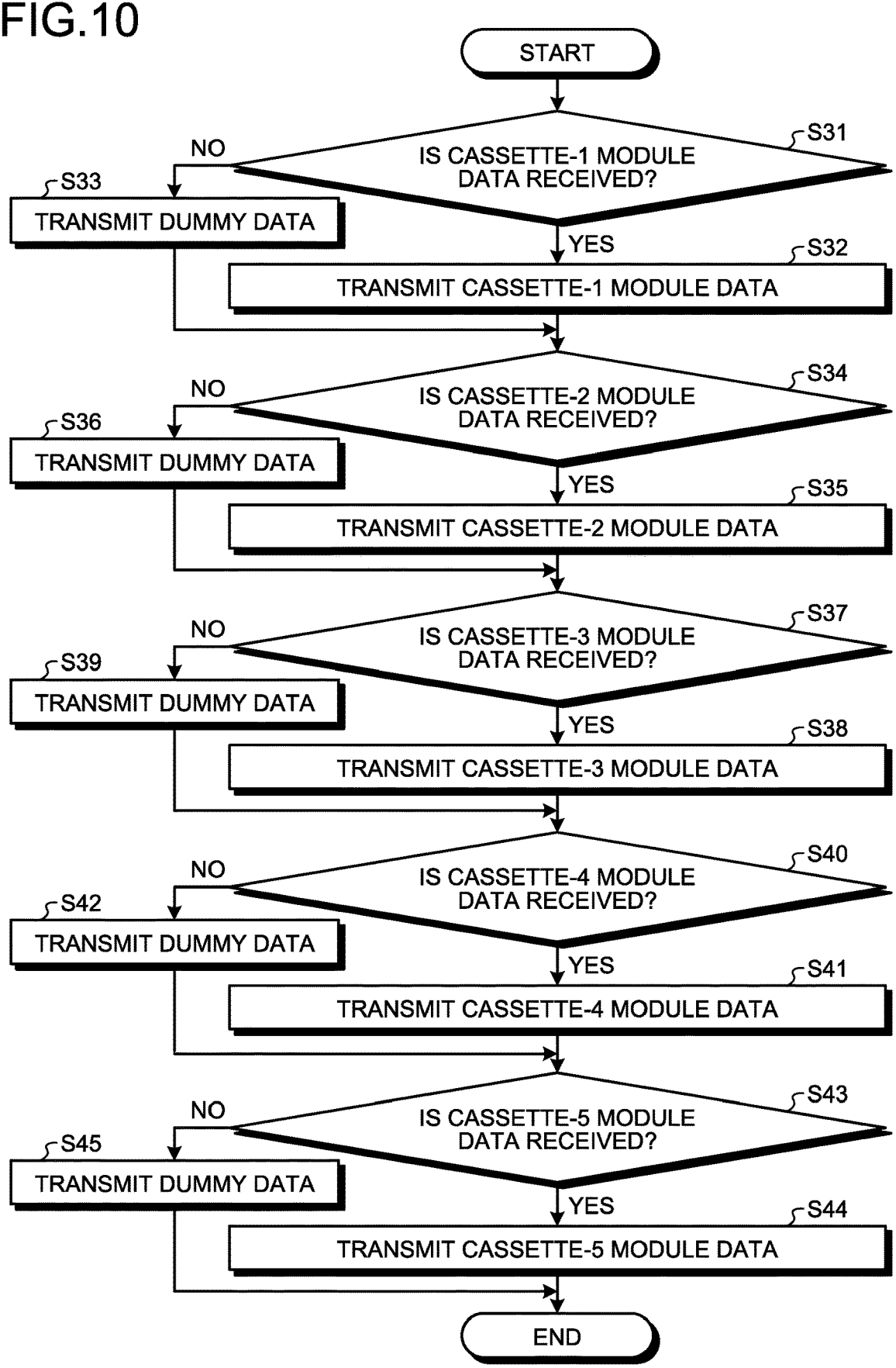
FIG. 10 is a flowchart illustrating a transmitting process in a transmitting unit of the control unit of the paper-currency-bill handling apparatus according to the embodiment.

Transmitting Process in Transmitting Unit of Control Unit of Paper-Currency-Bill Handling Apparatus According to Embodiment FIG. 10 is a flowchart illustrating a transmitting process in the transmitting unit of the control unit of the paper-currency-bill handling apparatus according to the embodiment. The transmitting process in the transmitting unit 8Tx of the control unit 8 of the paper-currency-bill handling apparatus 1 according to the embodiment is executed in predetermined periods.

The transmitting unit 8Tx determines whether or not receiving cassette-1 module data from a cassette-1 controlling unit 80-1 (Step S31). When receiving cassette-1 module data from the cassette-1 controlling unit 80-1 (Step S31: Yes), the transmitting unit 8Tx shifts the processing to Step S32, and when not receiving cassette-1 module data from the cassette-1 controlling unit 80-1 (Step S31: No), the transmitting unit 8Tx shifts the processing to Step S33. In Step S32, the transmitting unit 8Tx transmits the cassette-1 module data to all of the cassettes 6-$n$.

In Step S33, the transmitting unit 8Tx transmits dummy data to all of the cassettes 6-$n$. When Step S32 or Step S33 has ended, the transmitting unit 8Tx shifts the processing to Step S34.

In Step S34, the transmitting unit 8Tx determines whether or not receiving cassette-2 module data from a cassette-2 controlling unit 80-2. When receiving cassette-2 module data from the cassette-2 controlling unit 80-2 (Step S34: Yes), the transmitting unit 8Tx shifts the processing to Step S35, and when not receiving cassette-2 module data from the cassette-2 controlling unit 80-2 (Step S34: No), the transmitting unit 8Tx shifts the processing to Step S36. In Step S35, the transmitting unit 8Tx transmits the cassette-2 module data to all of the cassettes 6-$n$.

In Step S36, the transmitting unit 8Tx transmits dummy data to all of the cassettes 6-$n$. When Step S35 or Step S36 has ended, the transmitting unit 8Tx shifts the processing to Step S37.

In Step S37, the transmitting unit 8Tx determines whether or not receiving cassette-3 module data from a cassette-3 controlling unit 80-3. When receiving cassette-3 module data from the cassette-3 controlling unit 80-3 (Step S37: Yes), the transmitting unit 8Tx shifts the processing to Step S38, and when not receiving cassette-3 module data from the cassette-3 controlling unit 80-3 (Step S37: No), the transmitting unit 8Tx shifts the processing to Step S39. In Step S38, the transmitting unit 8Tx transmits the cassette-3 module data to all of the cassettes 6-$n$.

In Step S39, the transmitting unit 8Tx transmits dummy data to all of the cassettes 6-$n$. When Step S38 or Step S39 has ended, the transmitting unit 8Tx shifts the processing to Step S40.

In Step S40, the transmitting unit 8Tx determines whether or not receiving cassette-4 module data from a cassette-4 controlling unit 80-4. When receiving cassette-4 module data from the cassette-4 controlling unit 80-4 (Step S40: Yes), the transmitting unit 8Tx shifts the processing to Step S41, and when not receiving cassette-4 module data from the cassette-4 controlling unit 80-4 (Step S40: No), the transmitting unit 8Tx shifts the processing to Step S42. In Step S41, the transmitting unit 8Tx transmits the cassette-4 module data to all of the cassettes 6-$n$.

In Step S42, the transmitting unit 8Tx transmits dummy data to all of the cassettes 6-$n$. When Step S41 or Step S42 has ended, the transmitting unit 8Tx shifts the processing to Step S43.

In Step S43, the transmitting unit 8Tx determines whether or not receiving cassette-5 module data from a cassette-5 controlling unit 80-5. When receiving cassette-5 module data from the cassette-5 controlling unit 80-5 (Step S43: Yes), the transmitting unit 8Tx shifts the processing to Step S44, and when not receiving cassette-5 module data from the cassette-5 controlling unit 80-5 (Step S43: No), the transmitting unit 8Tx shifts the processing to Step S45. In Step S44, the transmitting unit 8Tx transmits the cassette-5 module data to all of the cassettes 6-$n$.

In Step S45, the transmitting unit 8Tx transmits dummy data to all of the cassettes 6-$n$. When Step S44 or Step S45 has ended, the transmitting unit 8Tx ends the transmitting process.

As described above, the transmitting process in the transmitting unit 8Tx is executed in predetermined periods, and thus the transmitting unit 8Tx is to transmit module data, received from the cassette-n controlling unit 80-$n$, to all of the cassettes 6-$n$, in the order of cassette-1 module data, cassette-2 module data, cassette-3 module data, cassette-4 module data, and cassette-5 module data.

Transmitting/Receiving Process in Cassette According to Embodiment

Figure 11:
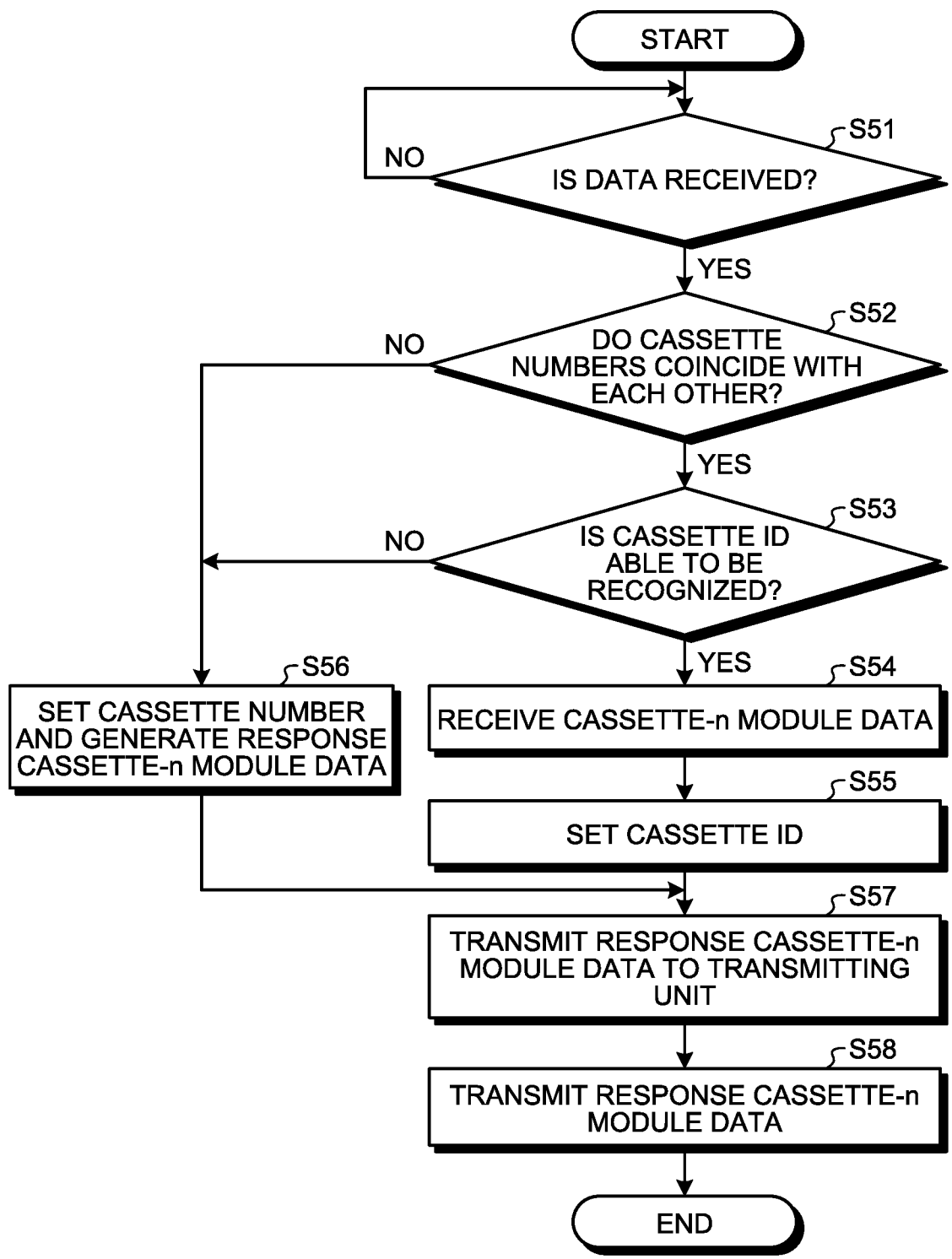
FIG. 11 is a flowchart illustrating a transmitting/receiving process in the cassette according to the embodiment.

FIG. 11 is a flowchart illustrating a transmitting/receiving process in the cassette according to the embodiment. The transmitting/receiving process in the cassette 6-$n$ according to the embodiment is executed in response to the transmitting process in the transmitting unit 8Tx of the control unit 8 of the paper-currency-bill handling apparatus 1 according to the embodiment illustrated in FIG. 10. The transmitting/receiving process in the cassette 6-$n$ according to the embodiment is independently executed for each of the cassettes 6-$n$ in predetermined periods.

The reception unit 6-$n$Rx of the cassettes 6-$n$ determines whether or not receiving data (Step S51). When receiving data (Step S51: Yes), the reception unit 6-$n$Rx shifts the processing to Step S52, and when not receiving data (Step S51: No), the reception unit 6-$n$Rx repeats Step S51.

In Step S52, the reception unit 6-$n$Rx determines whether or not the cassette number taken out of a field to which the cassette number of the data received in Step S51 is set coincides with the cassette number 6-$n$a stored in the storage 6-$n$S. When the cassette numbers coincide with each other (Step S52: Yes), the reception unit 6-nRx shifts the processing to Step S53, and when the cassette numbers do not coincide with each other (Step S52: No), the reception unit 6-nRx shifts the processing to Step S56.

In Step S53, the reception unit 6-nRx determines whether or not a cassette ID taken out of a field to which the cassette ID of the data received in Step S51 is stored in the ID correspondence table 6-nb stored in the storage 6-nS, so as to determine whether or not the cassette ID is able to be recognized. When being able to recognize a cassette ID (Step S53: Yes), the reception unit 6-nRx shifts the processing to Step S54, and when not being able to recognize a cassette ID (Step S53: No), the reception unit 6-nRx shifts the processing to Step S56.

In Step S54, the control unit 60-n receives the data, which is received by the reception unit 6-nRx in Step S51, from the reception unit 6-nRx, so as to receive cassette-n module data. In Step S55, the control unit 60-n acquires, with reference to the ID correspondence table 6-nb while regarding a cassette ID taken out of the received cassette-n module data as a "body-side cassette ID", a corresponding "cassette-side cassette ID", and sets the acquired "cassette-side cassette ID" to a predetermined field of the received response cassette-n module data.

On the other hand, in Step S56, the control unit 60-n generates response cassette-n module data having a predetermined field to which a cassette number of the cassette 6-n is set (Step S55).

In Step S57, the control unit 60-n transmits the response cassette-n module data to the transmitting unit 6-nTx. Next, in Step S58, the transmitting unit 6-nTx transmits, to the control unit 8, the response cassette-n module data received from the control unit 60-n. When Step S58 has ended, the cassette 6-n ends the transmitting/receiving process.

Figure 12:
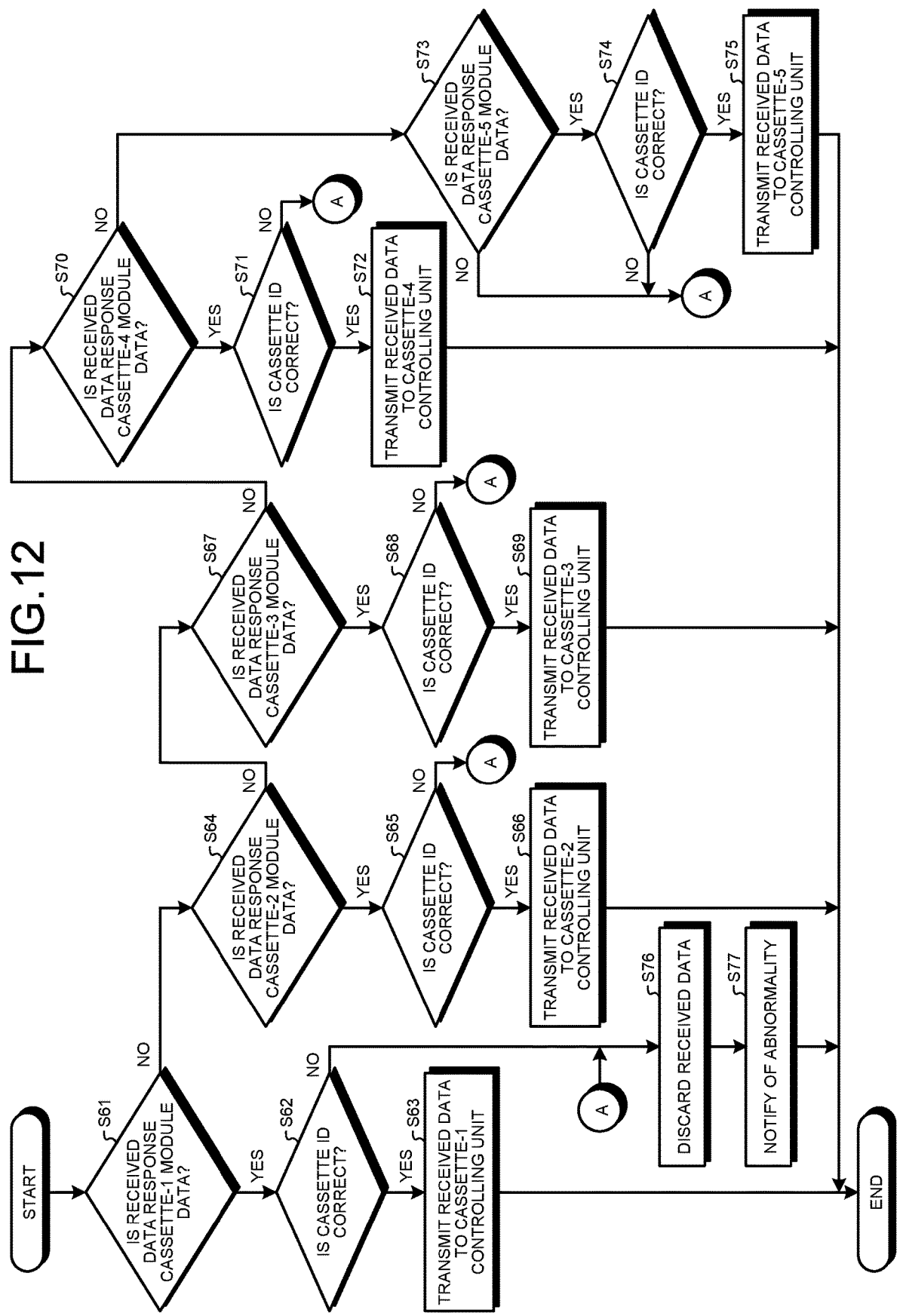
FIG. 12 is a flowchart illustrating a receiving process in a reception unit of the control unit of the paper-currency-bill handling apparatus according to the embodiment.

Receiving Process in Reception Unit of Control Unit of Paper-Currency-Bill Handling Apparatus According to Embodiment FIG. 12 is a flowchart illustrating a receiving process in a reception unit of the control unit of the paper-currency-bill handling apparatus according to the embodiment. The receiving process in the reception unit 8Rx of the control unit 8 of the paper-currency-bill handling apparatus 1 according to the embodiment is executed by the reception unit 8Rx in predetermined periods.

In Step S61, the reception unit 8Rx determines whether or not received data is response cassette-1 module data. When the received data is response cassette-1 module data (Step S61: Yes), the reception unit 8Rx shifts the processing to Step S62, and when the received data is not response cassette-1 module data (Step S61: No), the reception unit 8Rx shifts the processing to Step S64.

In Step S62, the reception unit 8Rx determines whether or not a cassette ID, which is set to a predetermined field of the received response cassette-1 module data, is correct. The response cassette-1 module data is data that is received from the cassette 6-1 as a response to the cassette-1 module data. Herein, "cassette ID is correct" means that a cassette ID set in the received response cassette-1 module data is stored in "cassette-side cassette IDs" of the ID correspondence table 8b, and a "body-side cassette ID" corresponding to this cassette ID coincides with a cassette ID that is set in cassette-1 module data temporarily stored in the reception unit 8Rx.

When the cassette ID is correct (Step S62: Yes), the reception unit 8Rx shifts the processing to Step S63, and when the cassette ID is not correct (Step S62: No), the reception unit 8Rx shifts the processing to Step S76. In Step S63, the reception unit 8Rx transmits, to the cassette-1 controlling unit 80-1, the received data (response cassette-1 module data).

In Step S64, the reception unit 8Rx determines whether or not the received data is response cassette-2 module data. When the received data is response cassette-2 module data (Step S64: Yes), the reception unit 8Rx shifts the processing to Step S65, and when the received data is not response cassette-2 module data (Step S64: No), the reception unit 8Rx shifts the processing to Step S67.

In Step S65, the reception unit 8Rx determines whether or not a cassette ID, which is set in a predetermined field of the received response cassette-2 module data, is correct. The response cassette-2 module data is data that is received from the cassette 6-2 as a response to the cassette-2 module data.

When the cassette ID is correct (Step S65: Yes), the reception unit 8Rx shifts the processing to Step S66, and when the cassette ID is not correct (Step S65: No), the reception unit 8Rx shifts the processing to Step S76. In Step S66, the reception unit 8Rx transmits, to the cassette-2 controlling unit 80-2, the received data (response cassette-2 module data).

In Step S67, the reception unit 8Rx determines whether or not the received data is response cassette-3 module data. When the received data is response cassette-3 module data (Step S67: Yes), the reception unit 8Rx shifts the processing to Step S68, and when the received data is not response cassette-3 module data (Step S67: No), the reception unit 8Rx shifts the processing to Step S70.

In Step S68, the reception unit 8Rx determines whether or not a cassette ID, which is set in a predetermined field of the received response cassette-3 module data, is correct. The response cassette-3 module data is data that is received from the cassette 6-3 as a response to the cassette-3 module data.

When the cassette ID is correct (Step S68: Yes), the reception unit 8Rx shifts the processing to Step S69, and when the cassette ID is not correct (Step S68: No), the reception unit 8Rx shifts the processing to Step S76. In Step S69, the reception unit 8Rx transmits, to the cassette-3 controlling unit 80-3, the received data (response cassette-3 module data).

In Step S70, the reception unit 8Rx determines whether or not the received data is response cassette-4 module data. When the received data is response cassette-4 module data (Step S70: Yes), the reception unit 8Rx shifts the processing to Step S71, and when the received data is not response cassette-4 module data (Step S70: No), the reception unit 8Rx shifts the processing to Step S73.

In Step S71, the reception unit 8Rx determines whether or not a cassette ID set in a predetermined field of the received response cassette-4 module data is correct. The response cassette-4 module data is data that is received from the cassette 6-4 as a response to the cassette-4 module data.

When the cassette ID is correct (Step S71: Yes), the reception unit 8Rx shifts the processing to Step S72, and when the cassette ID is not correct (Step S71: No), the reception unit 8Rx shifts the processing to Step S76. In Step S72, the reception unit 8Rx transmits, to the cassette-4 controlling unit 80-4, the received data (response cassette-4 module data).

In Step S73, the reception unit 8Rx determines whether or not the received data is response cassette-5 module data. When the received data is response cassette-5 module data (Step S73: Yes), the reception unit 8Rx shifts the processing to Step S74, and when the received data is not the response cassette-5 module data (Step S73: No), the reception unit 8Rx shifts the processing to Step S76.

In Step S74, the reception unit 8Rx determines whether or not a cassette ID set in a predetermined field of the received response cassette-4 module data is correct. The response cassette-5 module data is data that is received from the cassette 6-5 as a response to the cassette-5 module data.

When the cassette ID is correct (Step S74: Yes), the reception unit 8Rx shifts the processing to Step S75, and when the cassette ID is not correct (Step S74: No), the reception unit 8Rx shifts the processing to Step S76. In Step S75, the reception unit 8Rx transmits, to the cassette-5 controlling unit 80-5, the received data (response cassette-5 module data).

In Step S76, the reception unit 8Rx discards the received data, and further shifts the processing to Step S77. In Step S77, the reception unit 8Rx informs the cassette-n controlling unit 80-n of an abnormality. When being informed of an abnormality from the reception unit 8Rx, in Step S77, the cassette-n controlling unit 80-n executes a predetermined process such as an abnormality notification (display and/or alarm) and an abnormality warning (notification for manager and/or security personnel).

When any one of Step S63, Step S66, Step S69, Step S72, Step S75, and Step S77 has ended, the reception unit 8Rx ends the receiving process.

The processes of Step S63, Step S66, Step S69, Step S72, and Step S75 for transmitting received data to the cassette-n controlling unit 80-n are examples of the receiving process in which the cassette-n controlling unit 80-n receives received data received by the reception unit 6-nRx in Step S61, Step S64, Step S67, Step S70, and Step S73.

Figure 13:
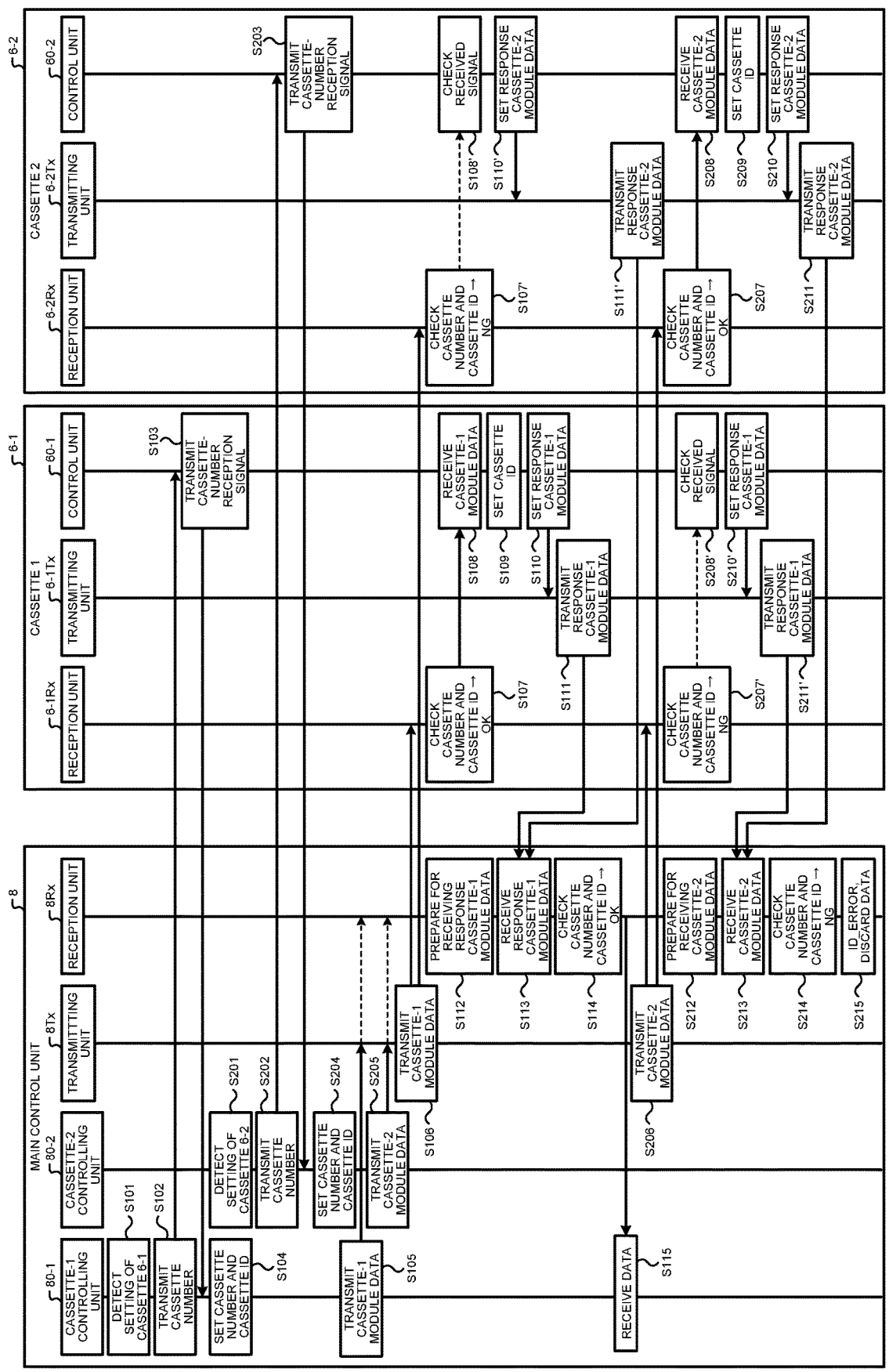
FIG. 13 is a sequence diagram illustrating a communication process in the paper-currency-bill handling apparatus according to the embodiment.

Communication Process in Paper-Currency-Bill Handling Apparatus According to Embodiment FIG. 13 is a sequence diagram illustrating a communication process in the paper-currency-bill handling apparatus according to the embodiment. FIG. 13 includes the processes illustrated in FIGS. 8 to 12. In FIG. 13, the case is exemplified where the cassette 6-1 is an authentic cassette and the cassette 6-2 is an inauthentic cassette.

In FIG. 13, only the cassette 6-1 and the cassette 6-2 are illustrated, and illustration of the other cassettes of the cassette 6-3, the cassette 6-4, and the cassette 6-5 is omitted; however, they are similar to the cassette 6-1 and the cassette 6-2. In FIG. 13, the processing order of the processes associated with the cassette 6-1 and the processes associated with the cassette 6-2 is not limited to that illustrated in FIG. 13. For example, in FIG. 13, a processing order of setting detection of the cassette 6-1 (Step S101) is earlier than that of setting detection of the cassette 6-2 (Step S201); however, the setting detection of the cassette 6-1 (Step S101) is not needed to be earlier than that of the setting detection of the cassette 6-2 (Step S201).

In Step S101, the cassette-1 controlling unit 80-1 of the control unit 8 of the paper-currency-bill handling apparatus 1 detects setting of the cassette 6-1. Next, in Step S102, the cassette-1 controlling unit 80-1 transmits, to the control unit 60-1 of the cassette 6-1, a cassette number. In Step S103, the control unit 60-1 of the cassette 6-1 transmits, to the cassette-1 controlling unit 80-1, a cassette-number reception signal.

Next, in Step S104, the cassette-1 controlling unit 80-1 sets, to a predetermined field of cassette-1 module data, a cassette number of the cassette 6-1 and a cassette ID selected at random. Next, in Step S105, the cassette-1 controlling unit 80-1 transmits the cassette-1 module data to the transmitting unit 8Tx, and further transmits, to the reception unit 8Rx, the cassette number and the cassette ID that are set to the cassette-1 module data. The reception unit 8Rx temporarily stores therein the received cassette number and cassette ID. Next, in Step S106, the transmitting unit 8Tx transmits the cassette-1 module data to the cassette 6-1 and the cassette 6-2.

In Step S107, the reception unit 6-1Rx of the cassette 6-1 checks the cassette number and cassette ID that are set to the cassette-1 module data, determines that the cassette-1 module data is module data addressed to the cassette 6-1, and transmits the cassette-1 module data to the control unit 60-1 of the cassette 6-1.

In Step S108, the control unit 60-1 receives cassette-1 module data from the reception unit 6-1Rx. Next, in Step S109, the control unit 60-1 regards, with reference to an ID correspondence table 6-1$b$, a module ID set in the cassette-1 module data received from the reception unit 6-1Rx as a "body-side cassette ID", in Step S110, sets a "cassette-side cassette ID", corresponding to the "body-side cassette ID", to the cassette-1 module data to generate response cassette-1 module data, and transmits the generated response cassette-1 module data to the transmitting unit 6-1Tx. Next, in Step S111, the transmitting unit 6-1Tx transmits, to the reception unit 8Rx of the control unit 8, the response cassette-1 module data received from the control unit 60-1.

On the other hand, in Step S107', the reception unit 6-2Rx of the cassette 6-2 checks the cassette number and the cassette ID that are set in the cassette-1 module data, determines that the cassette-1 module data is not module data addressed to the cassette 6-2, and informs the control unit 60-2 in the cassette 6-2 of the fact indicating that module data not addressed to the cassette 6-2 is received.

In Step S108', when being informed of the fact indicating that module data not addressed to the cassette 6-2 is received from the reception unit 6-2Rx, the control unit 60-2 checks that the received module data is module data not addressed to the cassette 6-2. Next, in Step S110', the control unit 60-2 sets a cassette number of the cassette 6-2 to response cassette-2 module data so as to generate it, and transmits the generated response cassette-2 module data to the transmitting unit 6-2Tx. Next, in Step S111', the transmitting unit 6-2Tx transmits, to the reception unit 8Rx of the control unit 8, the response cassette-2 module data received from the control unit 60-2.

Next, in Step S112, the reception unit 8Rx of the control unit 8 prepares for receiving response cassette-1 module data from the cassette 6-1 and for receiving response cassette-2 module data from the cassette 6-2, and receives, in Step S113, the response cassette-1 module data and the response cassette-2 module data. However, the response cassette-2 module data received in Step S113 is not a response corresponding to the cassette-1 module data transmitted in Step S106, and thus, in Step S114, the reception unit 8Rx determines that the response cassette-1 module data is a response to the cassette-1 module data and that the cassette 6-1 is an authentic cassette, as a result of the check of the set cassette number and cassette ID. In Step S115, the reception unit 8Rx transmits, to the cassette-1 controlling unit 80-1, the received response cassette-1 module data (receive by using cassette-1 controlling unit 80-1).

On the other hand, in Step S201, the cassette-2 controlling unit 80-2 detects setting of the cassette 6-2. Next, in Step S202, the cassette-2 controlling unit 80-2 transmits a cassette number to the control unit 60-2 of the cassette 6-2. Next, in Step S203, the control unit 60-2 of the cassette 6-2 transmits a cassette-number reception signal to the cassette-2 controlling unit 80-2.

Next, in Step S204, the cassette-2 controlling unit 80-2 sets, to a predetermined field of the cassette-2 module data, the cassette number of the cassette 6-2 and a cassette ID selected at random. Next, in Step S205, the cassette-2 controlling unit 80-2 transmits the cassette-2 module data to the transmitting unit 8Tx and further transmits, to the reception unit 8Rx, the cassette number and cassette ID that are set to the cassette-2 module data. The reception unit 8Rx temporarily stores therein the received cassette number and cassette ID. Next, in Step S206, the transmitting unit 8Tx transmits the cassette-2 module data to the cassette 6-1 and the cassette 6-2.

Next, in Step S207, the reception unit 6-2Rx of the cassette 6-2 checks the cassette number and the cassette ID that are set to the cassette-2 module data, determines that the cassette-2 module data is module data addressed to the cassette 6-2, and transmits the cassette-2 module data to the control unit 60-2 of the cassette 6-2.

In Step S208, the control unit 60-2 receives cassette-2 module data from the reception unit 6-2Rx. Next, in Step S209, the control unit 60-2 regards, with reference to an ID correspondence table 6-2*b*, a module ID set in the cassette-2 module data received from the reception unit 6-2Rx as a "body-side cassette ID", sets, in Step S210, a "cassette-side cassette ID" corresponding to the "body-side cassette ID" to the cassette-2 module data to generate response cassette-2 module data, and transmits the generated response cassette-2 module data to the transmitting unit 6-2Tx. Next, in Step S211, the transmitting unit 6-2Tx transmits, to the reception unit 8Rx of the control unit 8, the response cassette-2 module data received from the control unit 60-2.

On the other hand, in Step S207', the reception unit 6-1Rx of the cassette 6-1 checks the cassette number and the cassette ID that are set in the cassette-2 module data, determines that the cassette-2 module data is not module data addressed to the cassette 6-1, and informs the control unit 60-1 in the cassette 6-1 of the fact indicating that module data not addressed to the cassette 6-1 is received.

In Step S208', when being informed of the fact that module data not addressed to the cassette 6-1 is received from the reception unit 6-1Rx, the control unit 60-1 checks that the received module data is module data not addressed to the cassette 6-1. Next, in Step S210', the control unit 60-1 sets the cassette number of the cassette 6-1 to the response cassette-1 module data to generate it, and transmits the generated response cassette-1 module data to the transmitting unit 6-1Tx. Next, in Step S211', the transmitting unit 6-1Tx transmits, to the reception unit 8Rx of the control unit 8, the response cassette-1 module data received from the control unit 60-1.

Next, in Step S212, the reception unit 8Rx of the control unit 8 prepares for receiving response cassette-1 module data from the cassette 6-1 and for receiving response cassette-2 module data from the cassette 6-2, and receives, in Step S213, the response cassette-1 module data and a response cassette-2 module data. However, the response cassette-1 module data received in Step S213 is not the response corresponding to the cassette-2 module data transmitted in Step S206, and thus, in Step S214, the reception unit 8Rx determines that the response cassette-2 module data is a response to the cassette-2 module data and further determines, on the basis of a cassette ID, that the cassette 6-2 is an inauthentic cassette, as a result of the check of the set cassette number and cassette ID. In Step S215, the reception unit 8Rx discards, as "ID_ERROR", the received response cassette-2 module data. The reception unit 8Rx informs the cassette-2 controlling unit 80-2 of the fact indicating that the inauthentic cassette 6-2 is detected.

In the embodiment described above, in the communication between the control unit 8 of the paper-currency-bill handling apparatus 1 and the cassette 6-*n*, the control unit 8 transmits, to the cassette 6-*n*, cassette-n module data to which a cassette number and a cassette ID (body-side cassette ID) selected at random from among a plurality of IDs are set. The cassette 6-*n* transmits, to the control unit 8, response cassette-n module data to which a cassette number and a cassette ID (cassette-side cassette ID) corresponding to the cassette ID (body-side cassette ID) in the ID correspondence table 6-*nb* are set. The control unit 8 executes a receiving process on the response cassette-n module data when the cassette ID (body-side cassette ID) corresponding to the cassette ID (cassette-side cassette ID) included in the received response cassette-n module data in the ID correspondence table 8*b* coincides with a cassette ID set to the cassette-n module data, and discards the response cassette-n module data when not coinciding with each other.

According to the embodiment, the control unit 8 of the paper-currency-bill handling apparatus 1 disables connection to an inauthentic cassette attached to the paper-currency-bill handling apparatus 1, so that it is possible to improve the security of the paper-currency-bill handling apparatus 1. Furthermore, according to the embodiment, it is possible to increase a difficulty level in analyzing communication between the control unit 8 and the cassette 6-*n* to make the communication security more reliable, and further it is possible to prevent replication of the cassette to be able to improve the security of the paper-currency-bill handling apparatus 1.

In the embodiment, each time when the cassette 6-*n* is attached to the paper-currency-bill handling apparatus 1, a cassette ID is decided at random, and the cassette ID is re-decided at random at a predetermined timing. Thus, according to the embodiment, it is possible to increase a difficulty level in analyzing communication between the control unit 8 and the cassette 6-*n* to make the communication security more reliable.

In the embodiment, the cassette-n controlling units 80-*n* (n=1, 2, . . . , 5) of the control unit 8 share the transmitting unit 8Tx and the reception unit 8Rx, and the cassettes 6-*n* (n=1, 2, . . . , 5) are multidrop-connected, so that it is possible to reduce transmitting modules and reception modules. Moreover, in the embodiment, the control unit 8 and the cassettes 6-*n* perform multidrop-connection communication therebetween, so that it is possible to increase a difficulty level in analyzing communication to make the communication security more reliable compared with a case where a cassette module, which is provided for each cassette in the control unit 8 of the paper-currency-bill handling apparatus 1, communicates with the corresponding cassette.

Modification of Embodiment (1) About Timing of Re-Issuing Cassette ID

In the embodiment, the control unit 8 re-issues a cassette ID at a timing when the cassette 6-*n* is detached from the paper-currency-bill handling apparatus 1. However, not limited thereto, for example, the control unit 8 may re-issue a cassette ID each time when the cassette-n controlling unit 80-*n* transmits cassette-n module data. Or, the control unit 8 may re-issue a cassette ID each time when the number of transmission times of cassette-n module data transmitted by the cassette-n controlling unit 80-*n* reaches a predetermined number. Or, the control unit 8 may re-issue a cassette ID each time when a time interval having elapsed from a predetermined timing, counted by a timer for counting a time interval, becomes a predetermined time interval.

(2) Frame Format of Module Data

In the embodiment, as illustrated in FIG. 3, a frame format of the cassette-n module data is assumed to be constant (the same is true of response cassette-n module data). However, not limited thereto, the frame format of cassette-n module data may be changed at a predetermined timing (the same is true of response cassette-n module data). The change in the frame format of cassette-n module data includes, for example, a position change and/or an exchange of fields to which cassette numbers are set and/or fields to which cassette IDs are set.

Figure 14:
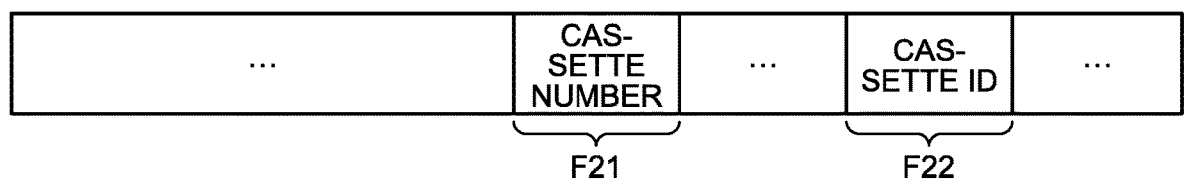
FIG. 14 is a diagram illustrating one example of a frame format of module data in a paper-currency-bill handling apparatus according to a modification of the embodiment.

FIG. 14 is a diagram illustrating one example of a frame format of module data in a paper-currency-bill handling apparatus according to a modification of the embodiment. For example, in a frame format of cassette-n module data illustrated in FIG. 14, positions of a field F21 to which a cassette number is set and a field F22 to which a cassette ID is set are different from positions of the field F11 and the field F12, in comparison with the frame format of cassette-n module data according to the embodiment illustrated in FIG. 3.

A predetermined timing, at which a frame format of cassette-n module data is changed, may be each time when the cassette-n controlling unit 80-n transmits the cassette-n module data, and/or each time when the cassette 6-n receives the cassette-n module data. Or, a predetermined timing, at which a frame format of cassette-n module data is changed, may be when the number of transmission times of cassette-n module data by the cassette-n controlling unit 80-n and/or the number of reception times of cassette-n module data by the cassette 6-n reaches a predetermined number. Or, a predetermined timing, at which a frame format of cassette-n module data is changed, may be each time when a time interval having elapsed from a predetermined timing, counted by a timer for counting a time interval, becomes a predetermined time interval.

The cassette-n controlling unit 80-n and the cassette 6-n may decide or specify, in accordance with a predetermined rule, field positions of a cassette number and a cassette ID by the cassette-n controlling unit 80-n and the cassette 6-n. Information for specifying field positions of a cassette number and a cassette ID may be included in control data of the cassette-n module data, and the cassette-n controlling unit 80-n and the cassette 6-n may specify, on the basis of this information, field positions of the cassette number and the cassette ID.

As described above, fields of cassette-n module data, to which the cassette number and the cassette ID are set, are dynamically changed, and thus a difficulty level of analyzing communication between the control unit 8 and the cassette 6-n is improved to be able to stiffen the communication security, so that it is possible to make it more difficult to replicate the cassette 6-n.

The configurations of the units exemplified in the above-mentioned embodiment may be changed or omitted without deviating from a technology range of the paper sheet handling apparatus and the communication method of the paper sheet handling apparatus according to the disclosed technology. Moreover, the embodiment is merely one example, and the disclosed technology further includes various kinds of other modes obtained by modifying and refining based on knowledge of one skilled in the art.

Reference Signs List

According to one example of the disclosed technology, it is possible to make it difficult to replicate a cassette storing therein paper sheets in a paper sheet handling apparatus, for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A paper sheet handling apparatus comprising:
   a plurality of detachable storages each of which stores therein paper sheets;
   a first memory that stores therein correspondence information, the correspondence information including a plurality of pieces of first identification information and pieces of second identification information that are uniquely associated with the respective pieces of the first identification information;
   a first controller configured to:
      when a storage of the storages is attached, inform the storage of an identification number, and further select, from the correspondence information, first identification information corresponding to the storage;
      transmit transmitted data to which the identification number and the selected first identification information are set;
      execute, in receiving data including the identification number, a receiving process on the data when identification information included in the data coincides with second identification information corresponding to the first identification information set to the transmitted data in the correspondence information; and
      discard the data when not coinciding with each other; and
   a transmitter that transmits dummy data, when the storage is not set to the paper sheet handling apparatus, or the transmitter does not receive the transmitted data itself from a cassette controller in transmitting the transmitted data.

2. The paper sheet handling apparatus according to claim 1, wherein
   each of the storages includes:
      a second memory that stores therein the correspondence information; and
      a second controller configured to:
         receive the transmitted data from the first controller;
         when the identification number included in the transmitted data coincides with an identification number informed-of, acquire, from the second memory, second identification information corresponding to the identification information included in the transmitted data; and
         transmit, to the first controller, data to which the acquired second identification information is set.

3. The paper sheet handling apparatus according to claim 1, wherein
the first controller re-selects, at a predetermined timing, first identification information to be set to the transmitted data.

4. The paper sheet handling apparatus according to claim 1, wherein
the first controller changes, at a predetermined timing, a field of the transmitted data for setting an identification number and first identification information to the transmitted data.

5. The paper sheet handling apparatus according to claim 1, wherein
when the first controller re-selects, at a predetermined timing, first identification information to be set to the transmitted data, each time when the storage is attached to the paper sheet handling apparatus, the first identification information is decided at random, and the first identification information is re-decided at random at a predetermined timing.

6. A communication method of a paper sheet handling apparatus, the paper sheet handling apparatus comprising:
a plurality of detachable storages each of which stores therein paper sheets;
a first memory that stores therein correspondence information, the correspondence information including a plurality of pieces of first identification information and pieces of second identification information that are uniquely associated with the respective pieces of the first identification information;
a transmitter; and
a first controller,
wherein
each of the storages includes:
a second memory that stores therein the correspondence information; and
a second controller,
wherein the communication method includes a process in which:
when a storage of the storages is attached, the first controller informs the storage of an identification number, and further selects, from the correspondence information, first identification information corresponding to the storage,
the first controller transmits transmitted data to which the identification number and the selected first identification information are set,
the second controller receives, from the first controller, the transmitted data,
when the identification number included in the transmitted data coincides with the identification number informed-of, the second controller acquires, from the second memory, second identification information corresponding to identification information included in the transmitted data; and
the second controller transmits, to the first controller, data to which the acquired second identification information is set,
the first controller executes, in receiving data including the identification number, a receiving process on the data when identification information included in the data coincides with second identification information corresponding to the first identification information set to the transmitted data in the correspondence information,
the first controller discards the data when not coinciding with each other, and
the transmitter transmits dummy data, when the storage is not set to the paper sheet handling apparatus, or the transmitter does not receive the transmitted data itself from the second controller in transmitting the transmitted data.

* * * * *